United States Patent
Zhou et al.

(10) Patent No.: US 12,459,612 B2
(45) Date of Patent: Nov. 4, 2025

(54) OFFSHORE FLOATING LIGHT ENERGY STORAGE INTEGRATED CHARGING STATION SYSTEM AND OPERATION CONTROL METHOD THEREOF

(71) Applicant: Northeastern University, Shenyang (CN)

(72) Inventors: Bowen Zhou, Shenyang (CN); Dongsheng Yang, Shenyang (CN); Guangdi Li, Shenyang (CN); Bo Yang, Shenyang (CN); Juan Zhang, Shenyang (CN); Peng Gu, Shenyang (CN); Yunfei Mu, Shenyang (CN); Jiayue Sun, Shenyang (CN); Diliyaer Hudabaierdi, Shenyang (CN)

(73) Assignee: NORTHEASTERN UNIVERSITY, Shenyang (CN)

( * ) Notice: Subject to any disclaimer, the term of this patent is extended or adjusted under 35 U.S.C. 154(b) by 0 days.

(21) Appl. No.: 18/687,583

(22) PCT Filed: Jul. 15, 2022

(86) PCT No.: PCT/CN2022/105927
§ 371 (c)(1),
(2) Date: Feb. 28, 2024

(87) PCT Pub. No.: WO2024/011571
PCT Pub. Date: Jan. 18, 2024

(65) Prior Publication Data
US 2024/0388085 A1 Nov. 21, 2024

(30) Foreign Application Priority Data
Jul. 13, 2022 (CN) .......................... 202210820127.2

(51) Int. Cl.
*B63B 35/44* (2006.01)
*B60L 53/30* (2019.01)
(Continued)

(52) U.S. Cl.
CPC .............. *B63B 35/44* (2013.01); *B60L 53/30* (2019.02); *B60L 53/51* (2019.02); *B60L 53/53* (2019.02);
(Continued)

(58) Field of Classification Search
CPC ............ B63B 35/44; B63B 2035/4453; B63B 2209/18; B60L 53/30; B60L 53/51;
(Continued)

(56) References Cited

U.S. PATENT DOCUMENTS

2024/0043094 A1\* 2/2024 Huiskamp ............... B63B 35/44
2024/0300625 A1\* 9/2024 Tyagi ...................... B63B 79/40

FOREIGN PATENT DOCUMENTS

CN 106100079 A 11/2016
CN 108909961 A 11/2018
(Continued)

*Primary Examiner* — Daniel Cavallari
(74) *Attorney, Agent, or Firm* — MUNCY, GEISSLER, OLDS & LOWE, P.C.

(57) ABSTRACT

Provided are an offshore floating light energy storage integrated charging station system and an operation control method thereof. The system includes a triangular floating floater structure, a control unit mounted on the floating floater structure, an energy storage tank arranged on the floating floater structure, an energy storage unit mounted in the energy storage tank, and a photovoltaic electricity generation unit paved on the energy storage tank. A battery pack in the energy storage tank on each triangular floater is one energy storage unit. The energy storage unit can independently supply electricity or charge the vessels when the photovoltaic electricity generation unit does not generate (Continued)

electricity and the state of charge of the energy storage unit is sufficient. The energy storage unit are controlled to switch between four control modes according to the system's needs to ensure stable operation of the system.

8 Claims, 9 Drawing Sheets

(51) Int. Cl.
  *B60L 53/51*   (2019.01)
  *B60L 53/53*   (2019.01)
  *H02J 1/12*   (2006.01)
  *H02J 1/14*   (2006.01)
  *H02S 10/20*   (2014.01)
  *H02S 20/30*   (2014.01)

(52) U.S. Cl.
  CPC .............. *H02J 1/12* (2013.01); *H02J 1/14* (2013.01); *H02S 10/20* (2014.12); *H02S 20/30* (2014.12); *B60L 2200/32* (2013.01); *B60L 2210/10* (2013.01); *B63B 2035/4453* (2013.01); *B63B 2209/18* (2013.01); *H02J 2300/26* (2020.01)

(58) Field of Classification Search
  CPC .. B60L 53/53; B60L 2200/32; B60L 2210/10; B60L 53/14; H02J 1/12; H02J 1/14; H02J 2300/26; H02J 7/00; H02J 7/35; H02S 10/20; H02S 20/30; H02S 20/00; Y02E 10/56; Y02T 90/12
  See application file for complete search history.

(56) References Cited

FOREIGN PATENT DOCUMENTS

| | | | | |
|---|---|---|---|---|
| CN | 109229292 A | | 1/2019 | |
| CN | 109263819 A | * | 1/2019 | ............. A01K 61/65 |
| CN | 209553451 U | | 10/2019 | |
| CN | 112928774 A | | 6/2021 | |
| CN | 113241995 A | | 8/2021 | |
| CN | 113844590 A | * | 12/2021 | ............. F03B 13/14 |
| CN | 109477665 B | * | 5/2023 | ........... H02S 40/425 |
| KR | 20210035941 A | * | 4/2021 | ............. F03B 13/12 |
| KR | 20230108086 A | * | 7/2023 | ........... B63B 22/166 |
| WO | WO 2021081775 A1 | | 5/2021 | |
| WO | WO-2022135730 A1 | * | 6/2022 | ............. B63B 35/34 |
| WO | WO 2022/146274 A1 | | 7/2022 | |

* cited by examiner

OFFSHORE FLOATING LIGHT ENERGY STORAGE INTEGRATED CHARGING STATION SYSTEM AND OPERATION CONTROL METHOD THEREOF

BACKGROUND OF THE INVENTION

1. Field of the Invention

The present invention relates to the technical field of offshore photovoltaic electricity generation, and particularly relates to an offshore floating light energy storage integrated charging station system and an operation control method thereof.

2. The Prior Arts

Transportation electrification, clean electricity, etc. have become a trend of energy consumption today. New energy and clean energy are sweeping across various fields of energy consumption. Modern vessels, especially ocean-going vessels, often use traditional fossil fuels due to high power and other reasons, thereby resulting in severe pollution. A port shore power supply technology provides energy sources for vessels when berthing at the port, which can reduce pollution inside a port. However, large ports usually have a large number of vessels moored near the sea waiting to enter, and shore power supply facilities are unable to provide electricity to the vessels, making it difficult to effectively alleviate pollution in offshore areas of ports.

Besides, as an important means of transportation in modern society, the vessels have also become one of the objects of new energy. Electric vessels have become new favorites in the market due to their advantages of zero emissions and low noise. However, problems such as vessel power batteries and endurance also constrain rapid development of electric vessels. We need to learn from a development law of electric vehicles and prioritize solving related charging infrastructure problems.

Under such background conditions, construction of offshore floating charging platforms can effectively meet the needs of clean electricity supply and endurance charging of electric vessels during mooring of conventional vessels. At present, there is relatively little research on offshore floating charging platform stations both domestically and internationally, with even fewer provided with energy storage units.

SUMMARY OF THE INVENTION

Based on the above problem, the present invention provides an offshore floating light energy storage integrated charging station system. The charging station system includes a triangular floating floater structure, a control unit, an energy storage unit, and a photovoltaic electricity generation unit, wherein an energy storage tank is arranged on the floating floater structure, the energy storage unit is mounted in the energy storage tank, and the photovoltaic electricity generation unit is paved on the energy storage tank.

The photovoltaic electricity generation unit is used for converting light energy into electrical energy.

The energy storage unit is used for storing excess electrical energy generated by the photovoltaic electricity generation unit, and providing a differential power when a power of the photovoltaic electricity generation unit is less than load demand power.

The control unit is used for controlling an operation mode of the system based on an illumination intensity ill, a state of charge (SOC) of the energy storage unit, a DC bus voltage $U_{dc}$, and a presence or an absence of a load on a charging interface.

The floating floater structure adopts a triangular structure with four triangular floaters connected together, and the triangular floaters are connected by hinged pieces; three top corners of the floating floater structure adopt a vertical cylindrical structure; and the floater includes a tubular shell and foam stuffed in a cavity enclosed by the shell.

The charging station system includes four parallel energy storage units and four parallel photovoltaic electricity generation units, each energy storage unit includes a plurality of batteries in series, and each photovoltaic electricity generation unit consists of a plurality of photovoltaic cells in series and parallel; and the control unit is a controller.

The charging station system further includes the charging interface, a first unidirectional DC/DC converter, a second unidirectional DC/DC converter, and a bidirectional DC/DC converter; wherein an input interface of the first unidirectional DC/DC converter is connected with an output interface of the photovoltaic electricity generation unit, a PWM interface of the first unidirectional DC/DC converter is connected with the control unit, an output interface of the first unidirectional DC/DC converter is connected with a DC bus, an input interface of the second unidirectional DC/DC converter is connected with the DC bus, a PWM interface of the second unidirectional DC/DC converter is connected with the control unit, an output interface of the second unidirectional DC/DC converter is connected with the charging interface, an input interface of the bidirectional DC/DC converter is connected with the energy storage unit, a PWM interface of the bidirectional DC/DC converter is connected with the control unit, and an output interface of the bidirectional DC/DC converter is connected with the DC bus.

The charging interface, the first unidirectional DC/DC converter, the second unidirectional DC/DC converter and the bidirectional DC/DC converter are integrated into three control boxes which are mounted on the three top corners of the floating floater structure.

An operation control method for the offshore floating light energy storage integrated charging station system includes the steps of:

Modes 1, 2: when $\delta_1\% < SOC \leq \delta_2\%$, and ill$<\varphi_1$, if an external load needs to be charged and the illumination intensity does not allow the photovoltaic electricity generation unit to generate electricity normally, the photovoltaic electricity generation unit is controlled to be in a standby state, and a droop discharging control manner is adopted to control an output electricity of the energy storage unit; if there is no load that needs to be charged, the illumination intensity does not allow the photovoltaic electricity generation unit to generate electricity normally, and the system stops operating, wherein SOC represents a state of charge of the energy storage unit, ill represents the illumination intensity, $\delta_1$, $\delta_2$ represents a percentage threshold of the energy storage unit in the state of charge, $\delta_1 < \delta_2$, and $\varphi_1$ represents a threshold of the illumination intensity;

Modes 3, 4: when $\delta_1\% < SOC \leq \delta_2\%$, ill$>\varphi_1$ and $U_{dc} < \gamma_1 U_N$, if the external load needs to be charged and an output power of the photovoltaic electricity generation unit is less than a charging power required by the load, an MPPT control manner is used for controlling the output power of the photovoltaic electricity generation unit, and the droop discharging control manner is used for controlling the output electricity of the energy storage unit; if there is no load that needs to be charged, a photovoltaic charging unit charges the energy storage unit, the MPPT control manner is used for controlling the output power of the photovoltaic electricity generation unit, and a droop charging control manner is used for charging the energy storage unit; wherein $\delta_1 < \delta_2$, $U_{dc}$ represents a voltage of the DC bus, $\gamma_1$ represents a threshold coefficient of the voltage of the DC bus, and $U_N$ represents a nominal operating voltage of the DC bus;

Modes 5, 6: when $\delta_1\% < SOC \leq \delta_2\%$, ill>$\varphi_1$ and $\gamma_1 U_N < U_{dc} < \gamma_2 U_N$, if the external load needs to be charged and the output power of the photovoltaic electricity generation unit is equal to the charging power required by the load, the MPPT control manner is used for controlling the output power of the photovoltaic electricity generation unit, and the energy storage unit is controlled to be in the standby state; if there is no load that needs to be charged, the photovoltaic charging unit charges the energy storage unit, a droop constant-voltage control manner is used for controlling the output power of the photovoltaic electricity generation unit, and a constant-power charging control manner is used for charging the energy storage unit; a voltage range of the DC bus is set as $\gamma_1 U_N \sim \gamma_2 U_N$; $\gamma_2$ represents a threshold coefficient of the voltage of the DC bus, $\gamma_1 < \gamma_2$;

Modes 7, 8: when $\delta_1\% < SOC \leq \delta_2\%$, ill>$\varphi_1$ and $U_{dc} > \gamma_2 U_N$, if the external load needs to be charged and the output power of the photovoltaic electricity generation unit is greater than the charging power required by the load, the MPPT control manner is used for controlling the output power of the photovoltaic electricity generation unit, and the droop charging control manner is used for charging the energy storage unit; if there is no load that needs to be charged, the photovoltaic charging unit charges the energy storage unit, the droop constant-voltage control manner is used for controlling the output power of the photovoltaic electricity generation unit, and the constant-power charging control manner is used for charging the energy storage unit;

Modes 9, 10: when SOC>$\delta_2\%$, and ill<$\varphi_1$, if an external load needs to be charged and the illumination intensity does not allow the photovoltaic electricity generation unit to generate electricity normally, the photovoltaic electricity generation unit is controlled to be in the standby state, and the droop discharging control manner is used for controlling the output electricity of the energy storage unit; if there is no load that needs to be charged, and the state of charge of the energy storage unit is sufficient and the energy storage unit does not need to be charged, the system stops operating;

Modes 11, 12: when SOC>$\delta_2\%$, ill>$\varphi_1$ and $U_{dc} < \gamma_1 U_N$, if the external load needs to be charged and the output power of the photovoltaic electricity generation unit is less than the charging power required by the load, the MPPT control manner is used for controlling the output power of the photovoltaic electricity generation unit, and the droop discharging control manner is used for controlling the output electricity of the energy storage unit; if there is no load that needs to be charged, and the state of charge of the energy storage unit is sufficient and the energy storage unit does not need to be charged, the system stops operating;

Modes 13, 14: when SOC>$\delta_2\%$, ill<$\varphi_1$ and $\gamma_1 U_N < U_{dc} < \gamma_2 U_N$, if the external load needs to be charged and the output power of the photovoltaic electricity generation unit is equal to the charging power required by the load, the MPPT control manner is used for controlling the output power of the photovoltaic electricity generation unit, and the energy storage unit is controlled to be in the standby state; if there is no load that needs to be charged, and the state of charge of the energy storage unit is sufficient and the energy storage unit does not need to be charged, the system stops operating;

Modes 15, 16: when SOC>$\delta_2\%$, ill<$\varphi_1$ and $U_{dc} > \gamma_2 U_N$, if the external load needs to be charged and the output power of the photovoltaic electricity generation unit is greater than the charging power required by the load, the droop constant-voltage control manner is used for controlling the output power of the photovoltaic electricity generation unit, and the state of charge of the energy storage unit is sufficient and the energy storage unit does not need to be charged, the energy storage unit is controlled to be in the standby state; if there is no load that needs to be charged, and the state of charge of the energy storage unit is sufficient and the energy storage unit does not need to be charged, the system stops operating;

Mode 17: when SOC<$\delta_1\%$, and ill<$\varphi_1$, if the illumination intensity does not allow the photovoltaic electricity generation unit to generate electricity normally, the energy storage unit and the load cannot be charged, and the system stops operating;

Mode 18: when SOC<$\delta_1\%$, ill>$\varphi_1$ and $U_{dc} < \gamma_1 U_N$, the output power of the photovoltaic electricity generation unit is smaller than the charging power required by the load, the state of charge of the energy storage unit does not meet a discharging state, the photovoltaic electricity generation unit needs to charge the energy storage unit, the MPPT control manner is used for controlling the output power of the photovoltaic electricity generation unit, and the droop charging control manner is used for charging the energy storage unit;

Modes 19, 20: when SOC≤$\delta_1\%$, ill>$\varphi_1$ and $\gamma_1 U_N < U_{dc} < \gamma_2 U_N$, if the external load needs to be charged and the output power of the photovoltaic electricity generation unit is equal to the charging power required by the load, the MPPT control manner is used for controlling the output power of the photovoltaic electricity generation unit, and the energy storage unit is controlled to be in the standby state; if there is no load that needs to be charged, the photovoltaic electricity generation unit needs to charge the energy storage unit, the droop constant-voltage control manner is used for controlling the output power of the photovoltaic electricity generation unit, and a constant-power charging control manner is used for charging the energy storage unit;

Modes 21, 22: when SOC≤$\delta_1\%$, ill>$\varphi_1$ and $U_{dc} > \gamma_2 U_N$, if the external load needs to be charged and the output power of the photovoltaic electricity generation unit is greater than the charging power required by the load, the MPPT control manner is used for controlling the output power of the photovoltaic electricity generation unit, and the droop charging control manner is used for charging the energy storage unit; and if there is no load that needs to be charged, the photovoltaic electricity generation unit needs to charge the energy storage unit, the droop constant-voltage control manner is used for controlling the output power of the photovoltaic electricity generation unit, and the constant-power charging control manner is used for charging the energy storage unit.

The droop constant-voltage control manner specifically includes: increasing voltage feedforward compensation control during droop control, comparing the voltage $U_{dc}$ of the DC bus with an expected value $U^*$ set by the voltage of the DC bus, outputting a compensation amount $\Delta U^*$ through a PI controller, subtracting a value obtained by performing dynamic compensation on $U^*$ from a product of r and $i_s$, sending a difference value to a voltage and current dual loop control, finally, generating a corresponding PWM signal $d_{pv}$, and controlling the first unidirectional DC/DC converter by $d_{pv}$, wherein $$U_{dc} = U^* - i_s r + \left(k_p + \frac{k_i}{s}\right)(U^* - U_{dc}),$$

wherein $k_p$ and $k_i$ are a proportional adjustment coefficient and an integral adjustment coefficient of the PI controller in a feedforward compensation controller, respectively; and $i_s$ represents an inductance current output by the converter, and r is a droop coefficient.

The droop charging control manner and the droop discharging control manner specifically includes: comparing $U_{dc}$ with U*, outputting the compensation amount ΔU* by the PI controller, subtracting a value obtained by performing dynamic compensation on U* from a product of R(SOC) and $i_s$, sending a difference value to a voltage and current dual loop control, finally, generating a corresponding PWM signal $d_b$, and controlling the bidirectional DC/DC converter by $d_b$, wherein $$U_{dc} = U^* - R(SOC)i_s + \left(k'_p + \frac{k'_i}{s}\right)(U^* - U_{dc}),$$

wherein $k'_p$ and $k'_i$ are a proportional adjustment coefficient and an integral adjustment coefficient of the PI controller in the feedforward compensation controller, respectively, and s is a complex variable of a PI transfer function; and R(SOC) is a droop coefficient based on the state of charge (SOC) of the energy storage unit.

The present invention has the following beneficial effects:

The present invention provides an offshore floating light energy storage integrated charging station system and an operation control method thereof. The system includes a triangular floating floater structure, and a control unit mounted on a floating floater structure, wherein an energy storage tank is arranged on the floating floater structure, an energy storage unit is mounted in the energy storage tank, and a photovoltaic electricity generation unit is paved on the energy storage tank. A battery pack in the energy storage tank on each triangular floater is one energy storage unit, which can effectively ensure that the entire system can maintain normal operation when a single energy storage unit fails. The energy storage unit can independently supply electricity or charge the vessels when the photovoltaic electricity generation unit does not generate electricity and the state of charge (SOC) of the energy storage unit is sufficient. The energy storage unit control adopts four control modes: a droop charging control mode, a droop discharging control mode, a constant-power charging control mode, and a standby mode. The four control modes are switched according to the system's needs to ensure stable operation of the system. Electrical energy provided by photovoltaic cells and batteries is supplied to conventional vessels or charged to electric vessels through a charging interface.

BRIEF DESCRIPTION OF DRAWINGS

In FIGS. 1-3, 1: floater; 2: aluminum alloy frame; 3: energy storage tank; 4: control box; 5: hinged piece; 6: mooring cable; and 7: anchorage body.

DETAILED DESCRIPTION OF THE PREFERRED EMBODIMENT

The following will provide further explanation of the present invention with reference to the accompanying drawings and specific implementation examples.

An offshore floating light energy storage integrated charging station system includes a triangular floating floater structure, a control unit, an energy storage unit, and a photovoltaic electricity generation unit, wherein an energy storage tank is arranged on the floating floater structure, the energy storage unit is mounted in the energy storage tank, and the photovoltaic electricity generation unit is paved on the energy storage tank.

The photovoltaic electricity generation unit is used for converting light energy into electrical energy.

The energy storage unit is used for storing excess electrical energy generated by the photovoltaic electricity generation unit, and providing a differential power when a power of the photovoltaic electricity generation unit is less than a load demand power.

The control unit is used for controlling an operation mode of the system based on an illumination intensity ill, a state of charge (SOC) of the energy storage unit, a DC bus voltage $U_{dc}$, and a presence or an absence of a load on a charging interface.

Figure 1:
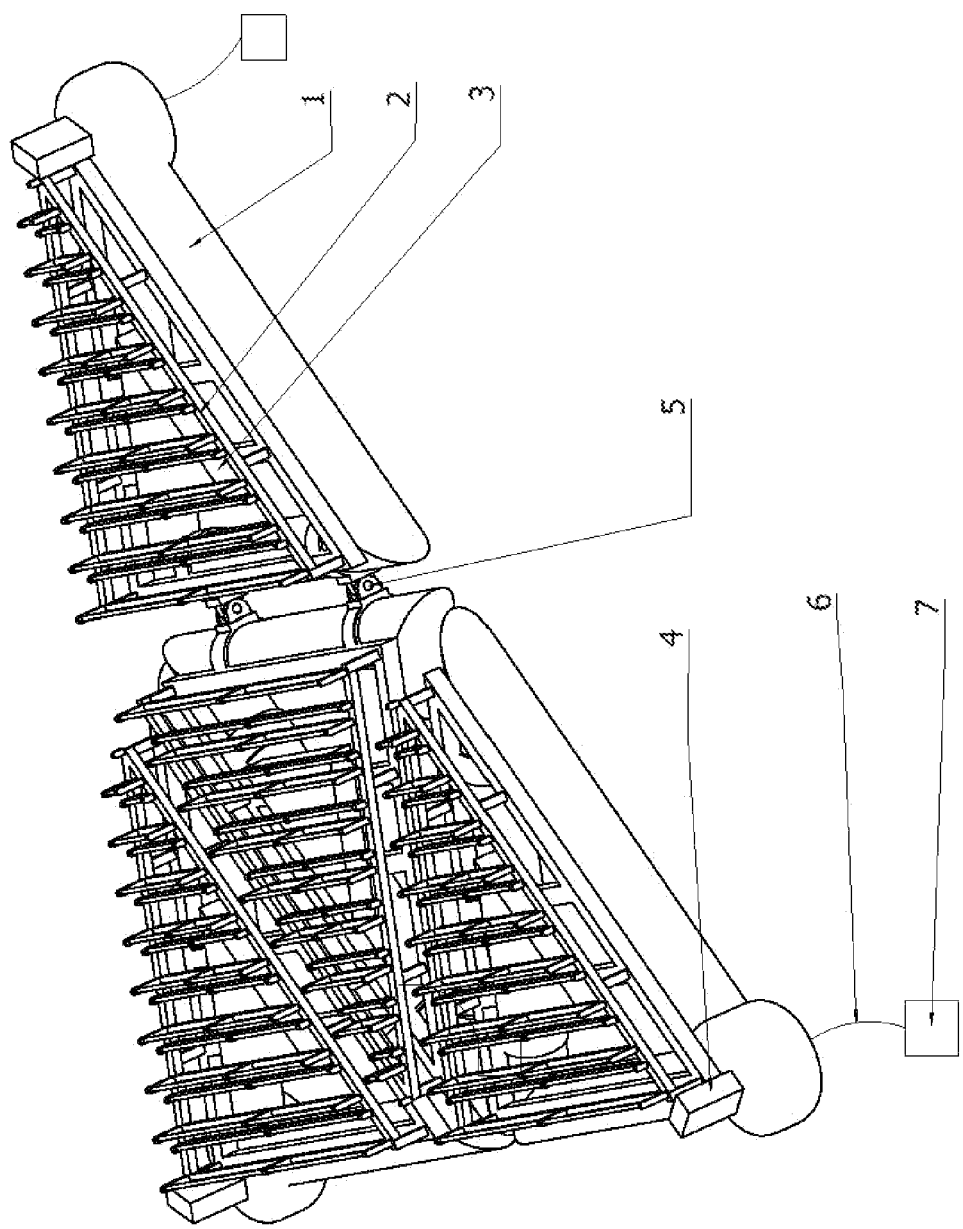
FIG. 1 is a schematic diagram of an offshore floating light energy storage integrated charging station system in the present invention.
Figure 2:
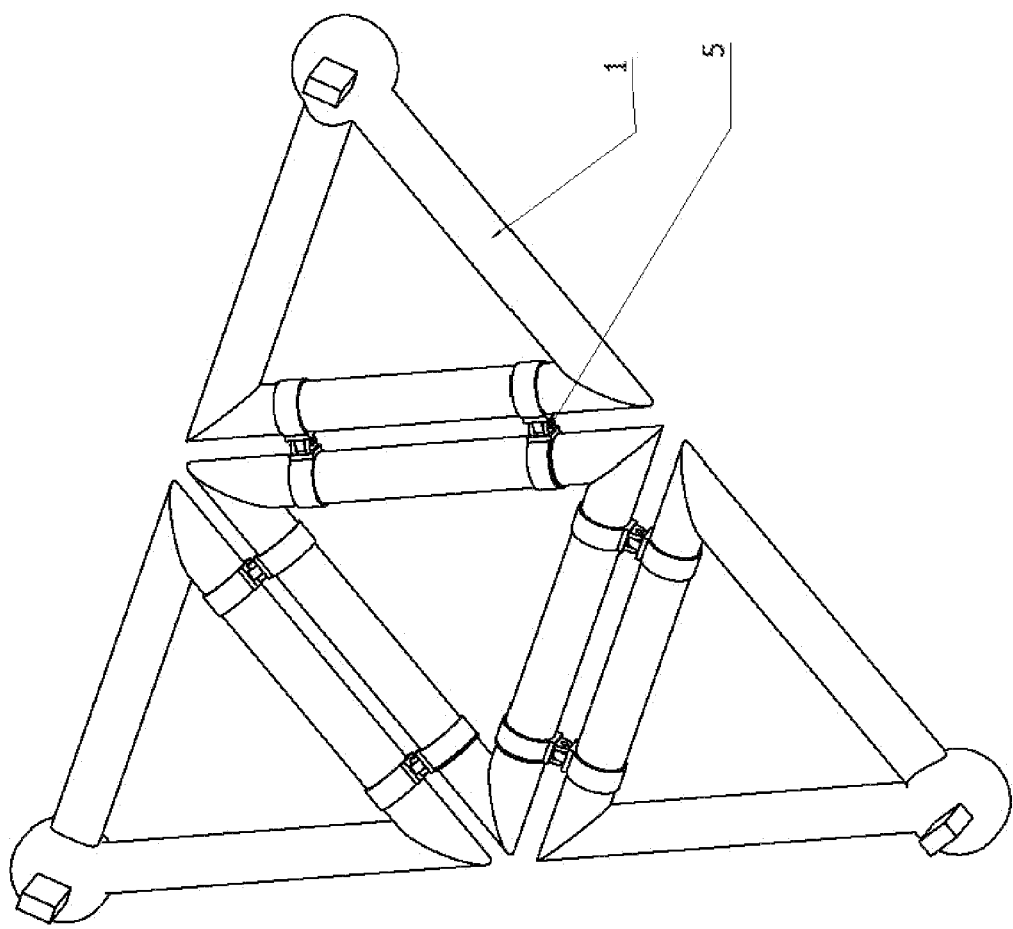
FIG. 2 is a schematic structural view of a floater in the present invention.
Figure 3:
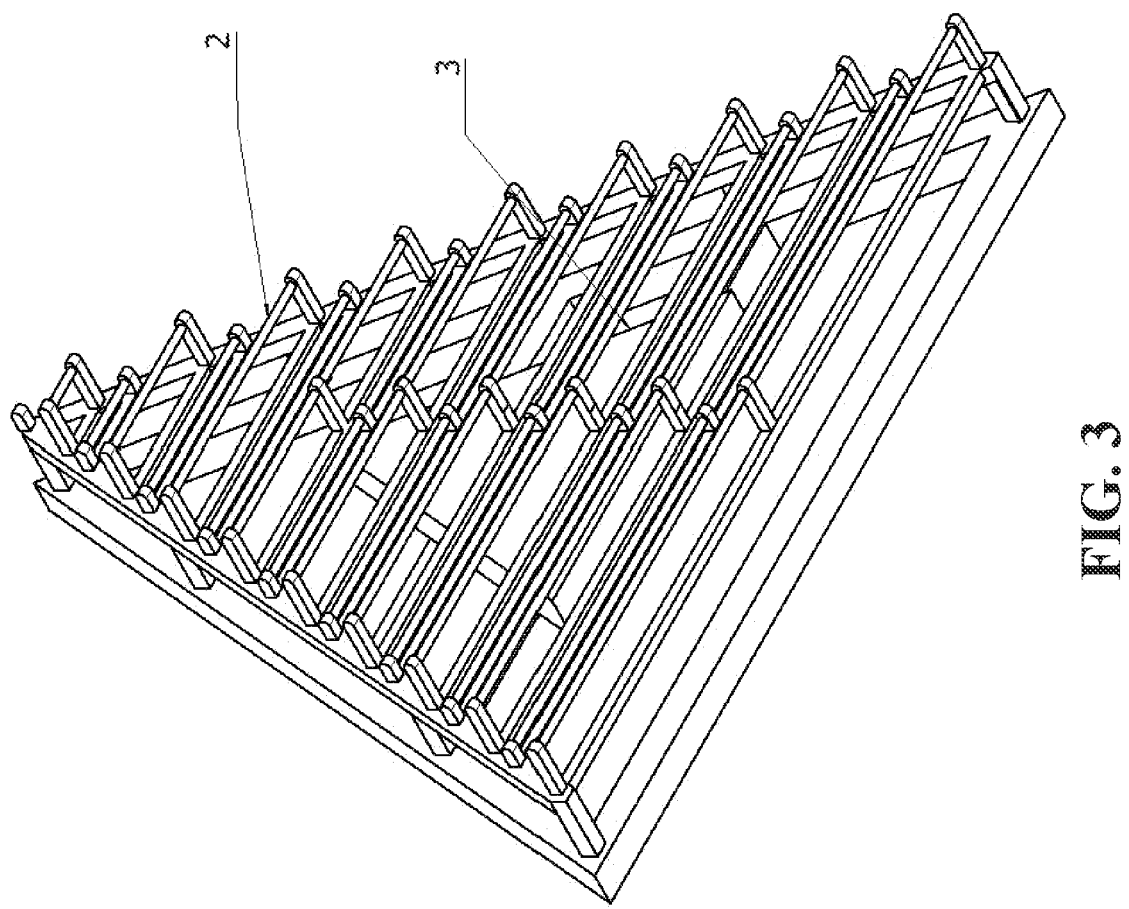
FIG. 3 is a schematic structural view of an aluminum alloy frame in the present invention.

As shown in FIGS. 1-3, the charging station system can be divided into three layers of structures, and a floating floater structure at the bottom layer provides buoyancy for floating in seawater. The middle layer includes an energy storage tank 3, a control box 4, and a control unit, wherein the energy storage unit is placed in the energy storage tank 3 and mainly consists of corrosion-resistant and moisture-proof batteries. The top layer is a placement layer for a photovoltaic charging unit, and an aluminum alloy frame 2 is mounted on the floating floater structure for paving a photovoltaic electricity generation unit. A plurality of photovoltaic panels form an array shape according to design requirements. The aluminum alloy frame 2 and the energy storage tank 3 are fixed on a triangular floater 1 in a triangular structure, and the bottoms of three top corners of the floater 1 are connected with an anchorage body 7. The anchorage body 7 is designed to help the entire floating photovoltaic electricity generation unit to resist the forces of wind, waves, and flows, and to avoid an excessive offset of the offshore floating light storage integrated charging station system under the influence of forces of a marine environment. The anchorage body 7 can adopt structural forms such as anchorage piles or boat anchors. A mooring cable 6 can be made of materials such as anchorage chains, steel wire ropes, and composites.

The floating floater structure adopts a triangular structure with four triangular floaters 1 connected together, and the triangular floaters 1 are connected through hinged pieces 5; three top corners of the floating floater structure adopt a vertical cylindrical structure; and the floater 1 includes a tubular shell and foam stuffed in a cavity enclosed by the shell. The triangular floater 1 is formed by connecting three tubular shells. In order to avoid deformation caused by reduced rigidity due to too large structure, the overall floating floater structure adopts a structure formed by connecting the four triangular floaters. The triangular floaters 1 are connected by the hinged pieces 5 which are sealed and waterproof. The energy storage tank 3 adopts a waterproof structure and is fixed on the floater structure through the aluminum alloy frame 2.

An aluminum alloy is adopted as a raw material for the shell, on one hand, the aluminum alloy has sufficient stiffness to resist cracking, and on the other hand, the aluminum alloy and an aluminum magnesium alloy have better resistance to seawater corrosion compared to other general metal sheets. They are not easily rusted or corroded in various water environments. On the other hand, the density of the aluminum alloy is relatively small, and the weight of the shell made of the aluminum alloy is lighter, thereby providing a greater portion of total buoyancy for the photovoltaic electricity generation unit carried by the platform. Certainly, it is also possible to consider using other lightweight, environmental-corrosion-resistance, and preferably rigid materials as the raw material for the shell, to replace commonly-used polyethylene or reinforced resins in existing technologies. The whole shell is hollow tubular, which defines the cavity inside, and foam is stuffed into the cavity. It is well known that the density of the foam is far smaller than that of water. In this way, even if the aluminum shell is broken under extreme conditions, water penetrates into a floater pipe through cracks. Based on the characteristics of the foam, the floater pipe can still provide sufficient buoyancy for the platform and the photovoltaic electricity generation unit carried on the platform.

In order to ensure the entire system to maintain normal operation in the event of failure of a single photovoltaic electricity generation unit, the charging station system includes four parallel energy storage units and four parallel photovoltaic electricity generation units, each energy storage unit includes a plurality of batteries in series, and each photovoltaic electricity generation unit consists of a plurality of photovoltaic cells in series and parallel according to the required voltage levels; the control unit is a controller; and the photovoltaic cell array on each triangular floater is the photovoltaic electricity generation unit, and the battery array on each triangular floater is the energy storage unit. The battery has undergone anti-corrosion and moisture-proof treatment, and is connected to the DC bus through a bidirectional DC/DC converter. The bidirectional DC/DC converter is used for realizing a charging/discharging function of the energy storage unit. In the embodiment, the triangular floater 1 has a side length of 8 m and can accommodate the photovoltaic electricity generation unit with a maximum power of 17 kW and the energy storage unit of 40 kWh.

Figure 4:
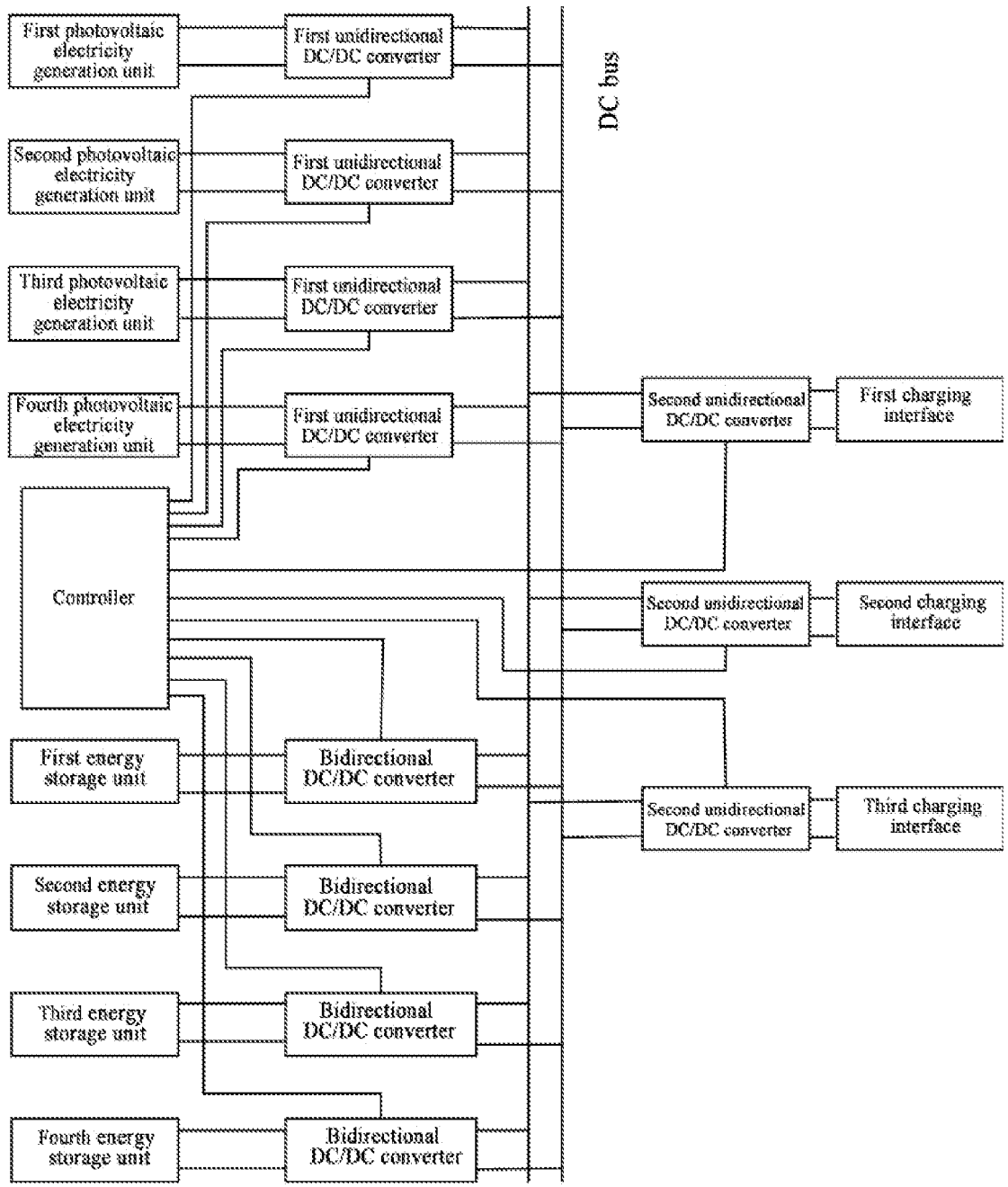
FIG. 4 is an electric wiring diagram of the offshore floating light energy storage integrated charging station system in the present invention.

The charging station system further includes a charging interface, a first unidirectional DC/DC converter, a second unidirectional DC/DC converter, and a bidirectional DC/DC converter. The converters are used to connect the photovoltaic electricity generation unit to the DC bus to achieve voltage boost and maximum power operation of the photovoltaic electricity generation unit. The charging interface is used to supply electrical energy provided by the system to loads such as conventional vessels or electric vessels. An input interface of the first unidirectional DC/DC converter is connected with an output interface of the photovoltaic electricity generation unit, a PWM interface of the first unidirectional DC/DC converter is connected with the control unit, an output interface of the first unidirectional DC/DC converter is connected with the DC bus, an input interface of the second unidirectional DC/DC converter is connected with the DC bus, a PWM interface of the second unidirectional DC/DC converter is connected with the control unit, an output interface of the second unidirectional DC/DC converter is connected with the charging interface, an input interface of the bidirectional DC/DC converter is connected with the energy storage unit, a PWM interface of the bidirectional DC/DC converter is connected with the control unit, and an output interface of the bidirectional DC/DC converter is connected with the DC bus. A specific wiring diagram is shown in FIG. 4.

The charging interface, the first unidirectional DC/DC converter, the second unidirectional DC/DC converter and the bidirectional DC/DC converter are integrated into three control boxes which are mounted on the three top corners of the floating floater structure; and the control units are mounted in one control box, and the control box is mounted in the triangular floater at a middle of the floating floater structure. In order to prevent imbalance of buoyancy of the floater structure due to imbalance of gravity on the floater structure from causing instability of the structure, a top angle of the floater located below the charging interface adopts a vertical cylindrical structure and is combined with the triangular structure.

Figure 5:
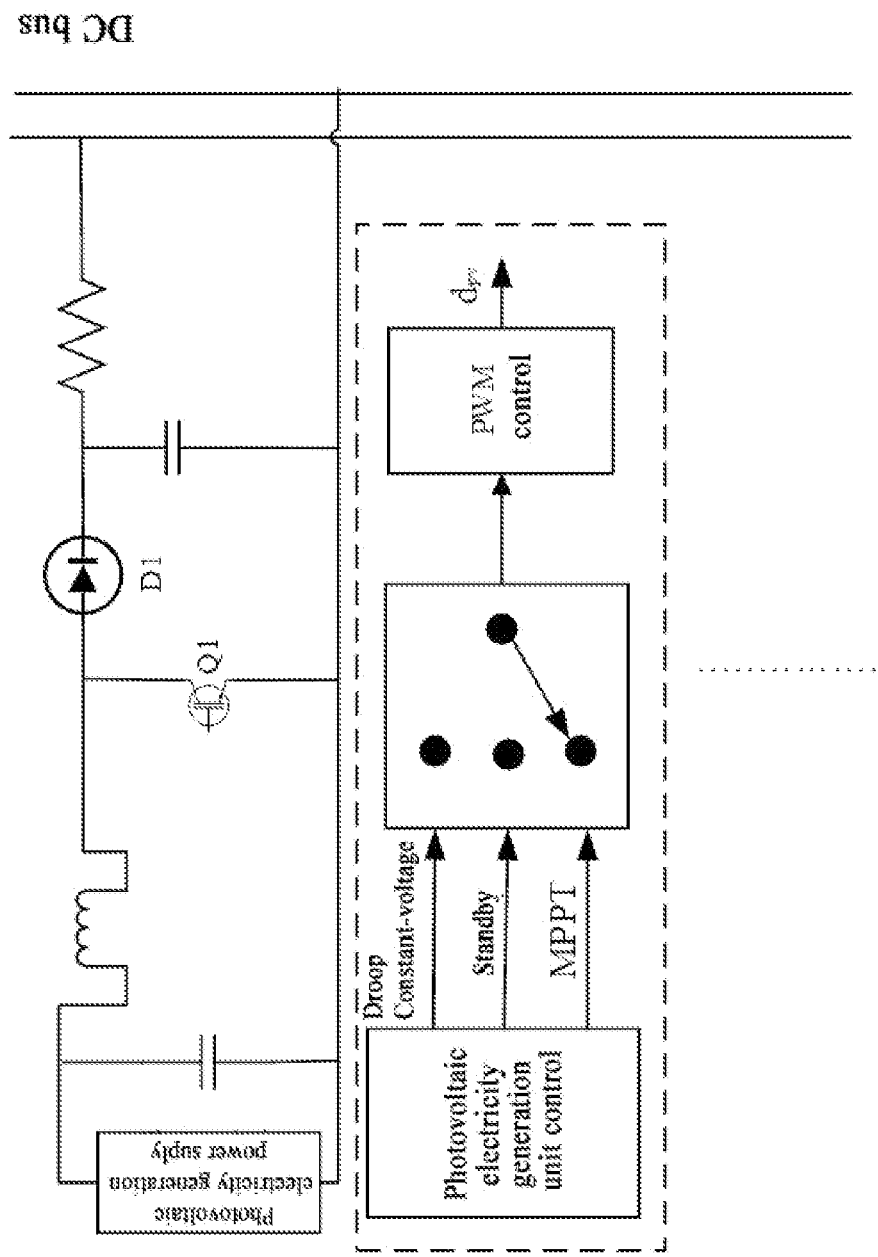
FIG. 5 is a coordinated control diagram of a photovoltaic electricity generation unit in the present invention.

As shown in FIG. 5, a control manner of the photovoltaic electricity generation unit is set as: a maximum power point tracking control (MPPT), a droop constant-voltage control, and a standby mode. The three operation modes are switched according to the system requirements, thereby guaranteeing a stable operation of the system.

A control manner of the energy storage unit is set as: a droop charging/discharging control, a constant-power charging control and the standby mode. The four operation modes are switched according to the system requirements, thereby guaranteeing a stable operation of the system. Besides, when the photovoltaic electricity generation unit does not generate electricity and the state of charge (SOC) of the energy storage unit is sufficient, the photovoltaic electricity generation unit can independently supply electricity or charge the vessels.

The MPPT control method adopts a traditional disturbance observation method.

The droop control adopts a droop control with voltage feedforward compensation, and the specific improvement method is as follows:

$$U_{dc} = U^* - i_s r,$$

wherein U* represents an expected value set by the voltage of the DC bus; and r is a droop coefficient.

Figure 6:
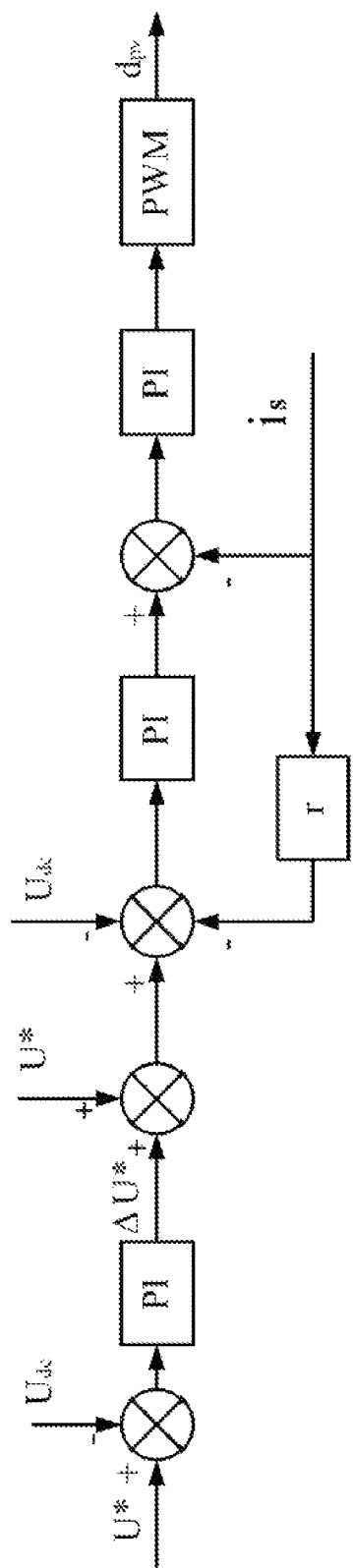
FIG. 6 is a droop constant-voltage control diagram of the photovoltaic electricity generation unit with voltage feedforward compensation in the present invention.

As shown in FIG. 6, a voltage feedforward compensation control is added to a traditional droop control. Specifically, the voltage $U_{dc}$ of the DC bus is first compared with U*, then a PI controller is used for outputting a compensation amount ΔU*, and dynamic compensation is performed on U*. Then, with the participation of the droop control, the result is sent to a voltage and current dual loop control, and a corresponding PWM signal $d_{pv}$ is generated to control the first unidirectional DC/DC converter through $d_{pv}$.

As can be seen from FIG. 6, $$U_{dc} = U^* - i_s r + \left(k_p + \frac{k_i}{s}\right)(U^* - U_{dc}),$$

wherein $k_p$ and $k_i$ are parameters of the PI controller in the feedforward compensation controller, respectively. $i_s$ represents an inductance current output by the converter.

Figure 7:
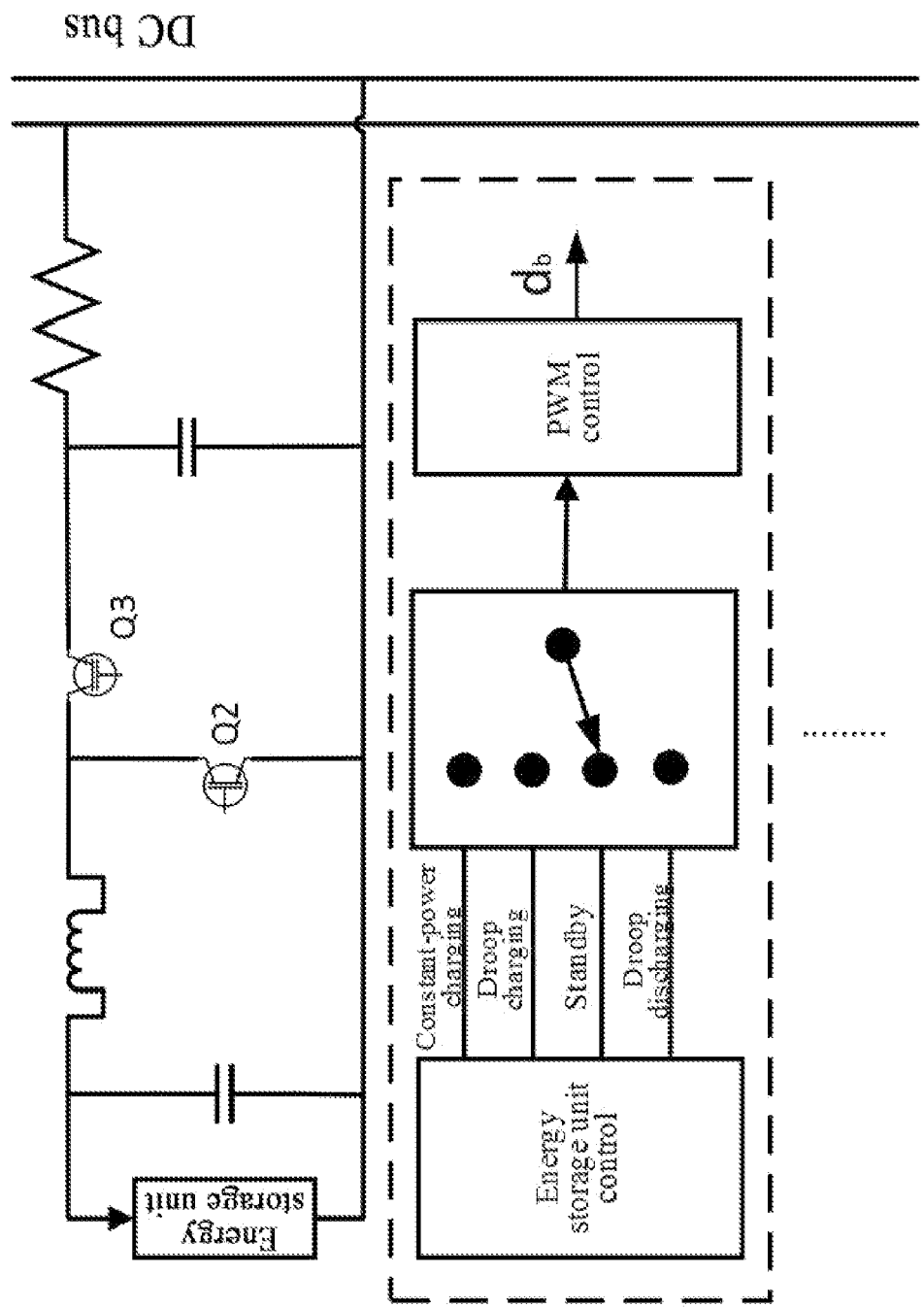
FIG. 7 is a coordinated control diagram of an energy storage unit in the present invention.

A control method of the energy storage unit is as shown in FIG. 7, and the energy storage unit adopts four operation modes: a droop charging and discharging control mode, a constant-power charging control mode and a standby mode. The four operation modes are switched according to the system requirements, thereby guaranteeing a stable operation of the system.

Figure 8:
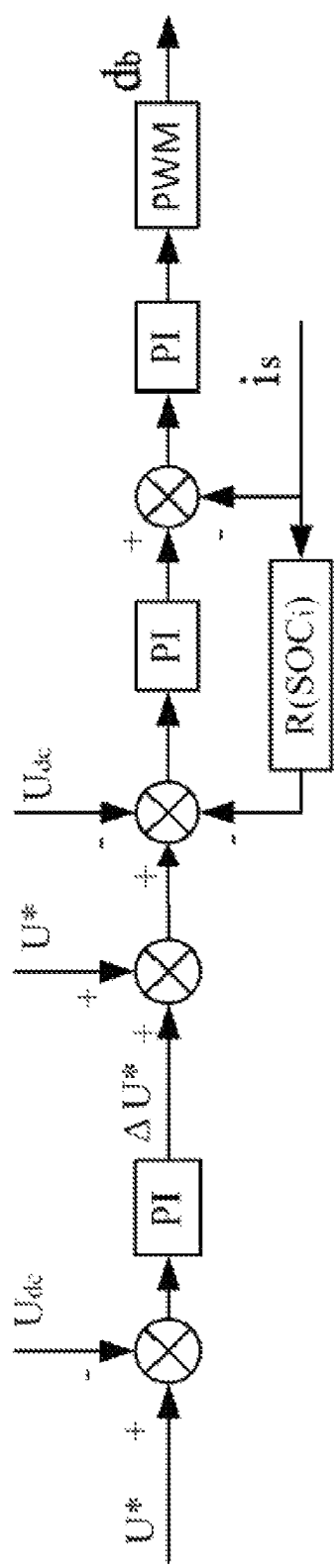
FIG. 8 is a droop charging and discharging control diagram of the energy storage unit in the present invention.

The droop control adopts an improved SOC droop control, as shown in FIG. 8. Through the improved SOC droop control, a resolution of the state of charge (SOC) of the energy storage unit is improved, the voltage of the DC bus is stabilized, and the system quickly converges to the SOC equilibrium state. The specific improvement method for the droop control is as follows:

An improved SOC droop characteristic equation is:

$$U_{dc} = U^* - R(SOC)i_{dc},$$

wherein:

$$R(SOC) = \begin{cases} k_D \exp[p(SOC^n - A_{soc^n})], & i_{dc} < 0 \\ k_D \exp[-p(SOC^n - A_{soc^n})], & i_{dc} > 0 \end{cases},$$

in the formula: R(SOC) is a droop coefficient based on the SOC of the energy storage unit; $k_D$ is a reference value for the droop coefficient; p is a convergence factor; and $A_{soc^n}$ is an average state of charge.

The above equation indicates that when $SOC^n$ eventually approaches to the average value $A_{soc^n}$, R(SOC) is equal to $k_D$. When the energy storage unit is $i_{dc}<0$ during charging and the SOC is higher than the average value, R(SOC)>$k_D$, and the energy storage unit absorbs less electricity; and when the SOC is below the average value, R(SOC)<$k_D$, and the energy storage unit absorbs more electricity. When the energy storage unit is $i_{dc}>0$ during discharging and the SOC is higher than the average value, R(SOC)<$k_D$, and the energy storage unit discharges more electricity; and when the SOC is below the average value, R(SOC)>$k_D$, and the energy storage unit discharges less electricity.

The voltage feedforward compensation control is increased in the improved SOC droop control. Specifically, $U_{dc}$ is first compared with U*, then the PI controller is used for outputting a compensation amount ΔU*, and dynamic compensation is performed on U*. Then, with the participation of the droop control, the result is sent to a voltage and current dual loop control, and a corresponding PWM signal $d_b$ is generated to control the bidirectional DC/DC converter through $d_b$.

As can be seen from FIG. 8, $$U_{dc} = U^* - R(SOC)i_s + \left(k'_p + \frac{k'_i}{s}\right)(U^* - U_{dc}),$$

wherein $k'_p$ and $k'_i$ are a proportional adjustment coefficient and an integral adjustment coefficient of the PI controller in the feedforward compensation controller, respectively, and s is a complex variable of a PI transfer function; and R(SOC) is a droop coefficient based on the state of charge (SOC) of the energy storage unit.

Figure 9:
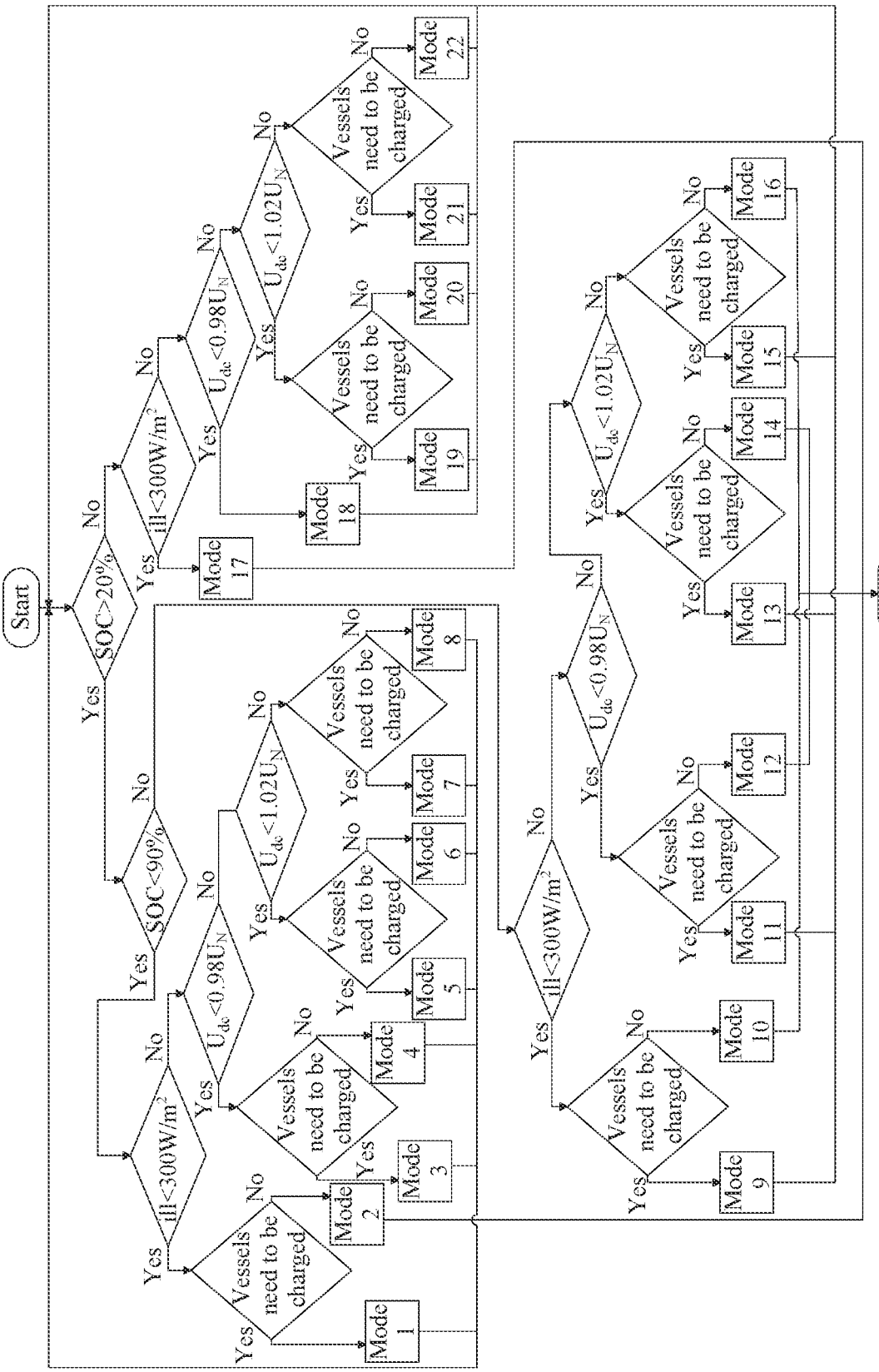
FIG. 9 is a working logic diagram of an offshore floating light energy storage integrated charging platform of the present invention.

As shown in FIG. 9, an operation control method for an offshore floating light energy storage integrated charging station system is implemented. The operation control method includes:

Setting $U_N$ as a nominal operating voltage of the DC bus of the system, combined with the actual operating conditions of the state of charge (SOC) of the energy storage unit, the illumination intensity (ill), the voltage $U_{dc}$ of the DC bus, and whether there is a need for vessels charging, the overall operating situation is divided into 22 operation modes.

Modes 1, 2: 20%<SOC≤90% and ill<300, when vessels are charged, the system operates in Mode 1. At this time, the illumination intensity does not allow the photovoltaic electricity generation unit to generate electricity normally, the photovoltaic electricity generation unit is in the standby mode, and the energy storage unit operates in the droop discharging mode. When no vessel needs to be charged, the system operates in Mode 2. At this time, the illumination intensity does not allow the photovoltaic electricity generation unit to generate electricity normally, and the system stops operating.

Modes 3, 4: 20%<SOC≤90%, and ill>300 W/m² and $U_{dc}$<0.98 $U_N$, when vessels are charged, the system operates in Mode 3. At this time, the output power of the photovoltaic electricity generation unit is smaller than the charging power of the vessels, the energy storage unit provides a differential power, the photovoltaic electricity generation unit operates in the MPPT mode, and the energy storage unit operates in the droop discharging mode. When no vessel needs to be charged, the system operates in Mode 4. At this time, the photovoltaic electricity generation unit charges the energy storage unit. In order to improve the utilization efficiency of the photovoltaic electricity generation unit, the photovoltaic electricity generation unit operates in the MPPT mode, and the energy storage unit operates in the droop charging mode.

Modes 5, 6: 20%<SOC≤90%, and ill>300 W/m² and 0.98 $U_N$<$U_{dc}$<1.02 $U_N$, when vessels are charged, the system operates in Mode 5. At this time, the output power of the photovoltaic electricity generation unit just meets the charging power of the vessels, the photovoltaic electricity generation unit operates in the MPPT mode, and the energy storage unit operates in the standby mode. When no vessel needs to be charged, the system operates in Mode 6. At this time, the photovoltaic electricity generation unit charges the energy storage unit. The photovoltaic electricity generation unit operates in the droop constant-voltage control mode, and the energy storage unit operates in the constant-power charging mode. In order to avoid frequent switching of the charging and discharging modes for the energy storage unit, a voltage range of a DC bus in Modes 5 and 6 is set to be 0.98 $U_N$ to 1.02 $U_N$.

Modes 7, 8: 20%<SOC≤90%, and ill>300 W/m² and $U_{dc}$>1.02 $U_N$, when vessels are charged, the system operates in Mode 7. At this time, the output power of the photovoltaic electricity generation unit is greater than the charging power of the vessels, the photovoltaic electricity generation unit operates in the MPPT mode, and the energy storage unit operates in the droop charging mode. When no vessel needs to be charged, the system operates in Mode 8. At this time, the photovoltaic electricity generation unit charges the energy storage unit. The photovoltaic electricity generation unit operates in the droop constant-voltage control mode, and the energy storage unit operates in the constant-power charging control mode.

Modes 9, 10: SOC>90% and ill<300 W/m², when vessels are charged, the system operates in Mode 9. At this time, the illumination intensity does not allow the photovoltaic electricity generation unit to generate electricity normally, the photovoltaic electricity generation unit is in the standby mode, and the energy storage unit operates in the droop discharging mode. When no vessel needs to be charged, the system operates in Mode 10. At this time, the illumination intensity does not allow the photovoltaic electricity generation unit to generate electricity normally, the state of charge of the energy storage unit is sufficient and the energy storage unit does not need to be charged, and the system stops operating.

Modes 11, 12: SOC>90%, and ill>300 W/m² and $U_{dc}$<0.98 $U_N$, when vessels are charged, the system operates in Mode 11. At this time, the output power of the photovoltaic electricity generation unit is smaller than the charging power of the vessels, the energy storage unit provides a differential power, the photovoltaic electricity generation unit operates in the MPPT mode, and the energy storage unit operates in the droop discharging mode. When no vessel is charged, the system operates in Mode 12. At this time, the state of charge of the energy storage unit is sufficient and the energy storage unit does not need to be charged, and the system stops operating.

Modes 13, 14: SOC>90%, and ill>300 W/m² and 0.98 $U_N$<$U_{dc}$<1.02 $U_N$, when vessels are charged, the system operates in Mode 13. At this time, the output power of the photovoltaic electricity generation unit just meets the charging power of the vessels, the photovoltaic electricity generation unit operates in the MPPT mode, and the energy storage unit operates in the standby mode. When no vessel is charged, the system operates in Mode 14. At this time, the state of charge of the energy storage unit is sufficient and the energy storage unit does not need to be charged, and the system stops operating.

Modes 15, 16: SOC>90%, and ill>300 W/m² and $U_{dc}$>1.02 $U_N$, when vessels are charged, the system operates in Mode 15. At this time, the output power of the photovoltaic electricity generation unit is greater than the charging power of the vessels, and the photovoltaic electricity generation unit operates in the droop constant-voltage control mode. At this time, the state of charge of the energy storage unit is sufficient and the energy storage unit does not need to be charged and is in the standby mode. When no vessel needs to be charged, the system operates in Mode 16. At this time, the state of charge of the energy storage unit is sufficient and the energy storage unit does not need to be charged, and the system stops operating.

Mode 17: SOC≤20% and ill<300 W/m², at this time, the illumination intensity does not allow the photovoltaic electricity generation unit to generate electricity normally, the state of charge of the energy storage unit does not meet the discharging state, and the energy storage unit cannot provide charging service for the vessels. The system stops operating.

Mode 18: SOC≤20%, and ill>300 W/m² and $U_{dc}$<0.98 $U_N$, at this time, the output power of the photovoltaic electricity generation unit is smaller than the charging power of the vessels, the state of charge of the energy storage unit does not meet the discharging state, and the energy storage unit cannot provide charging service for the vessels. The photovoltaic electricity generation unit charges the energy storage unit, the photovoltaic electricity generation unit operates in the MPPT mode, and the energy storage unit operates in the droop charging control mode.

Modes 19, 20: SOC≤20%, and ill>300 W/m² and 0.98 $U_N$<$U_{dc}$<1.02 $U_N$, when the vessels are charged, the system operates in the Mode 19. At this time, the output power of the photovoltaic electricity generation unit just meets the charging power of the vessels, the photovoltaic electricity generation unit operates in the MPPT mode, and the energy storage unit operates in the standby mode. When no vessel needs to be charged, the system operates in Mode 20. At this time, the photovoltaic electricity generation unit charges the energy storage unit. The photovoltaic electricity generation unit operates in the droop constant-voltage control mode, and the energy storage unit operates in the constant-power charging control mode.

Modes 21, 22: SOC≤20%, and ill>300 W/m² and $U_{dc}$>1.02 $U_N$, when vessels are charged, the system operates in Mode 21. At this time, the output power of the photovoltaic electricity generation unit is greater than the charging power of the vessels, the photovoltaic electricity generation unit operates in the MPPT mode, and the energy storage unit operates in the droop charging control mode. When no vessel needs to be charged, the system operates in Mode 22. At this time, the photovoltaic electricity generation unit charges the energy storage unit. The photovoltaic electricity generation unit operates in the droop constant-voltage control mode, and the energy storage unit operates in the constant-power charging control mode.

In order to achieve controlling normal startup, operation, and shutdown of the system, a human-machine interaction interface is designed and mounted at the position of each charging interface. The present invention has the following functions:

Starting up the system: designing a start-up button that can be pressed to start the system when the vessels need to be charged and the system is in an off state. After start-up, the system is controlled to judge whether the charging conditions are met. When the conditions are met, a screen displays "Please plug in equipment and start charging". When starting charging, the screen displays "Charging". When the charging is completed, the screen displays "Charging Completed". When the charging conditions are not met, the screen displays "Currently unable to supply electricity".

Periodically detecting the SOC and the illumination intensity: the system will automatically start when the SOC is less than 90% and the illumination intensity meets the operating conditions of the system.

Shutting down the system: the system will automatically shut down when the system judges that the operation has stopped or when there is a system malfunction that prevents normal operation.

What is claimed is:

1. An offshore floating light energy storage integrated charging station system, comprising:
    a triangular floating floater structure;
    a control unit;
    an energy storage unit; and
    a photovoltaic electricity generation unit,
    wherein an energy storage tank is arranged on the floating floater structure, the energy storage unit is mounted in the energy storage tank, and the photovoltaic electricity generation unit is paved on the energy storage tank;

the photovoltaic electricity generation unit is used for converting light energy into electrical energy;

the energy storage unit is used for storing excess electrical energy generated by the photovoltaic electricity generation unit, and providing a differential power when a power of the photovoltaic electricity generation unit is less than a load demand power; and the control unit is used for controlling an operation mode of the system based on an illumination intensity ill, a state of charge (SOC) of the energy storage unit, a DC bus voltage $U_{dc}$ and a presence or an absence of a load on a charging interface.

2. The system according to claim 1, wherein the floating floater structure adopts a triangular structure with four triangular floaters connected together, and the triangular floaters are connected by hinged pieces; three top corners of the floating floater structure adopt a vertical cylindrical structure; and the floater comprises a tubular shell and foam stuffed in a cavity enclosed by the shell.

3. The system according to claim 1, comprising four parallel energy storage units and four parallel photovoltaic electricity generation units, wherein each energy storage unit comprises a plurality of batteries in series, and each photovoltaic electricity generation unit consists of a plurality of photovoltaic cells in series and parallel; and the control unit is a controller.

4. The system according to claim 3, further comprising:
the charging interface, a first unidirectional DC/DC converter, a second unidirectional DC/DC converter, and a bidirectional DC/DC converter; wherein an input interface of the first unidirectional DC/DC converter is connected with an output interface of the photovoltaic electricity generation unit, a PWM interface of the first unidirectional DC/DC converter is connected with the control unit, an output interface of the first unidirectional DC/DC converter is connected with a DC bus, an input interface of the second unidirectional DC/DC converter is connected with the DC bus, a PWM interface of the second unidirectional DC/DC converter is connected with the control unit, an output interface of the second unidirectional DC/DC converter is connected with the charging interface, an input interface of the bidirectional DC/DC converter is connected with the energy storage unit, a PWM interface of the bidirectional DC/DC converter is connected with the control unit, and an output interface of the bidirectional DC/DC converter is connected with the DC bus.

5. The system according to claim 4, wherein the charging interface, the first unidirectional DC/DC converter, the second unidirectional DC/DC converter, and the bidirectional DC/DC converter are integrated into three control boxes which are mounted on three top corners of the floating floater structure.

6. An operation control method for the offshore floating light *energy storage integrated charging station system according to claim 1, comprising the steps:

when $\delta_1\% < SOC \leq \delta_2\%$, and ill$<\varphi_1$, if an external load needs to be charged and the illumination intensity does not allow the photovoltaic electricity generation unit to generate electricity normally, the photovoltaic electricity generation unit is controlled to be in a standby state, and a droop discharging control manner is adopted to control an output electricity of the energy storage unit; if there is no load that needs to be charged, the system stops operating, wherein SOC represents a state of charge of the energy storage unit, ill represents the illumination intensity, $\delta_1$, $\delta_2$ represents a percentage threshold of the energy storage unit in the state of charge, $\delta_1<\delta_2$, and $\varphi_1$ represents a threshold of the illumination intensity;

when $\delta_1\% < SOC \leq \delta_2\%$, ill$>\varphi_1$ and $U_{dc}<\gamma_1 U_N$, if the external load needs to be charged and an output power of the photovoltaic electricity generation unit is less than a charging power required by the load, an MPPT control manner is used for controlling the output power of the photovoltaic electricity generation unit, and the droop discharging control manner is used for controlling the output electricity of the energy storage unit; if there is no load that needs to be charged, a photovoltaic charging unit charges the energy storage unit, the MPPT control manner is used for controlling the output power of the photovoltaic electricity generation unit, and a droop charging control manner is used for charging the energy storage unit; wherein $U_{dc}$ represents a voltage of the DC bus, $\gamma_1$ represents a threshold coefficient of the voltage of the DC bus, and $U_N$ represents a nominal operating voltage of the DC bus;

when $\delta_1\% < SOC \leq \delta_2\%$, ill$>\varphi_1$ and $\gamma_1 U_N < U_{dc} < \gamma_2 U_N$, if the external load needs to be charged and the output power of the photovoltaic electricity generation unit is equal to the charging power required by the load, the MPPT control manner is used for controlling the output power of the photovoltaic electricity generation unit, and the energy storage unit is controlled to be in the standby state; if there is no load that needs to be charged, the photovoltaic charging unit charges the energy storage unit, a droop constant-voltage control manner is used for controlling the output power of the photovoltaic electricity generation unit, and a constant-power charging control manner is used for charging the energy storage unit; a voltage range of the DC bus is set as $\gamma_1 U_N \sim \gamma_2 U_N$; $\gamma_2$ represents a threshold coefficient of the voltage of the DC bus, $\gamma_1<\gamma_2$;

when $\delta_1\% < SOC \leq \delta_2\%$, ill$>\varphi_1$ and $U_{dc}>\gamma_2 U_N$, if the external load needs to be charged and the output power of the photovoltaic electricity generation unit is greater than the charging power required by the load, the MPPT control manner is used for controlling the output power of the photovoltaic electricity generation unit, and the droop charging control manner is used for charging the energy storage unit; if there is no load that needs to be charged, the photovoltaic charging unit charges the energy storage unit, the droop constant-voltage control manner is used for controlling the output power of the photovoltaic electricity generation unit, and the constant-power charging control manner is used for charging the energy storage unit;

when SOC$>\delta_2\%$, and ill$<\varphi_1$, if the external load needs to be charged and the illumination intensity does not allow the photovoltaic electricity generation unit to generate electricity normally, the photovoltaic electricity generation unit is controlled to be in the standby state, and the droop discharging control manner is used for controlling the output electricity of the energy storage unit; if there is no load that needs to be charged, and the state of charge of the energy storage unit is sufficient and the energy storage unit does not need to be charged, the system stops operating;

when SOC$>\delta_2\%$, ill$>\varphi_1$ and $U_{dc}<\gamma_1 U_N$, if the external load needs to be charged and the output power of the photovoltaic electricity generation unit is less than the charging power required by the load, the MPPT control manner is used for controlling the output power of the photovoltaic electricity generation unit, and the droop discharging control manner is used for controlling the output electricity of the energy storage unit; if there is no load that needs to be charged, and the state of charge of the energy storage unit is sufficient and the energy storage unit does not need to be charged, the system stops operating;

when SOC>$\delta_2$%, ill<$\varphi_1$ and $\gamma_1 U_N$<$U_{dc}$<$\gamma_2 U_N$, if the external load needs to be charged and the output power of the photovoltaic electricity generation unit is equal to the charging power required by the load, the MPPT control manner is used for controlling the output power of the photovoltaic electricity generation unit, and the energy storage unit is controlled to be in the standby state; if there is no load that needs to be charged, and the state of charge of the energy storage unit is sufficient and the energy storage unit does not need to be charged, the system stops operating;

when SOC>$\delta_2$%, il<$\varphi_1$ and $U_{dc}$>$\gamma_2 U_N$, if the external load needs to be charged and the output power of the photovoltaic electricity generation unit is greater than the charging power required by the load, the droop constant-voltage control manner is used for controlling the output power of the photovoltaic electricity generation unit, and the state of charge of the energy storage unit is sufficient and the energy storage unit does not need to be charged, the energy storage unit is controlled to be in the standby state; if there is no load that needs to be charged, and the state of charge of the energy storage unit is sufficient and the energy storage unit does not need to be charged, the system stops operating;

when SOC<$\delta_1$%, and ill<$\varphi_1$, if the illumination intensity does not allow the photovoltaic electricity generation unit to generate electricity normally, the energy storage unit and the load cannot be charged, and the system stops operating;

when SOC<$\delta_1$%, and ill>$\varphi_1$ and $U_{dc}$<$\gamma_1 U_N$, the output power of the photovoltaic electricity generation unit is smaller than the charging power required by the load, the state of charge of the energy storage unit does not meet a discharging state, the photovoltaic electricity generation unit needs to charge the energy storage unit, the MPPT control manner is used for controlling the output power of the photovoltaic electricity generation unit, and the droop charging control manner is used for charging the energy storage unit;

when SOC<$\delta_1$%, ill>$\varphi_1$ and $\gamma_1 U_N$<$U_{dc}$<$\gamma_2 U_N$, if the external load needs to be charged and the output power of the photovoltaic electricity generation unit is equal to the charging power required by the load, the MPPT control manner is used for controlling the output power of the photovoltaic electricity generation unit, and the energy storage unit is controlled to be in the standby state; if there is no load that needs to be charged, the photovoltaic electricity generation unit needs to charge the energy storage unit, the droop constant-voltage control manner is used for controlling the output power of the photovoltaic electricity generation unit, and the constant-power charging control manner is used for charging the energy storage unit;

when SOC<$\delta_1$%, ill>01 and $U_{dc}$>$\gamma_2 U_N$, if the external load needs to be charged and the output power of the photovoltaic electricity generation unit is greater than the charging power required by the load, the MPPT control manner is used for controlling the output power of the photovoltaic electricity generation unit, and the droop charging control manner is used for charging the energy storage unit; and if there is no load that needs to be charged, the photovoltaic electricity generation unit needs to charge the energy storage unit, the droop constant-voltage control manner is used for controlling the output power of the photovoltaic electricity generation unit, and the constant-power charging control manner is used for charging the energy storage unit.

7. The operation control method according to claim 6, wherein the charging station system comprises the charging interface, a first unidirectional DC/DC converter, a second unidirectional DC/DC converter, and a bidirectional DC/DC converter; wherein an input interface of the first unidirectional DC/DC converter is connected with an output interface of the photovoltaic electricity generation unit, a PWM interface of the first unidirectional DC/DC converter is connected with the control unit, an output interface of the first unidirectional DC/DC converter is connected with a DC bus, an input interface of the second unidirectional DC/DC converter is connected with the DC bus, a PWM interface of the second unidirectional DC/DC converter is connected with the control unit, an output interface of the second unidirectional DC/DC converter is connected with the charging interface, an input interface of the bidirectional DC/DC converter is connected with the energy storage unit, a PWM interface of the bidirectional DC/DC converter is connected with the control unit, and an output interface of the bidirectional DC/DC converter is connected with the DC bus, wherein the droop constant-voltage control method specifically comprises: increasing voltage feedforward compensation control during droop control, comparing the voltage $U_{dc}$ of the DC bus with an expected value U set by the voltage of the DC bus, outputting a compensation amount $\Delta U$ through a PI controller, subtracting a value obtained by performing dynamic compensation on U* from a product of r and $i_s$, sending a difference value to a voltage and current dual loop control, finally, generating a corresponding PWM signal $d_{pv}$, and controlling the first unidirectional DC/DC converter by $d_{pv}$, wherein $$U_{dc} = U^* - i_s r + \left(k_p + \frac{k_i}{s}\right)(U^* - U_{dc}),$$

Wherein $k_p$ and $k_i$ are a proportional adjustment coefficient and an integral adjustment coefficient of the PI controller in a feedforward compensation controller, respectively; and is represents an inductance current output by the converter, and r is a droop coefficient.

8. The operation control method according to claim 6, wherein the charging station system comprises the charging interface, a first unidirectional DC/DC converter, a second unidirectional DC/DC converter, and a bidirectional DC/DC converter; wherein an input interface of the first unidirectional DC/DC converter is connected with an output interface of the photovoltaic electricity generation unit, a PWM interface of the first unidirectional DC/DC converter is connected with the control unit, an output interface of the first unidirectional DC/DC converter is connected with a DC bus, an input interface of the second unidirectional DC/DC converter is connected with the DC bus, a PWM interface of the second unidirectional DC/DC converter is connected with the control unit, an output interface of the second unidirectional DC/DC converter is connected with the charging interface, an input interface of the bidirectional DC/DC converter is connected with the energy storage unit, a PWM interface of the bidirectional DC/DC converter is connected with the control unit, and an output interface of the bidirectional DC/DC converter is connected with the DC bus, wherein the droop charging control manner and the droop discharging control manner specifically includes: comparing $U_{dc}$ with $U^*$, outputting the compensation amount $\Delta U$ by the PI controller, subtracting a value obtained by performing dynamic compensation on $U^*$ from a product of R (SOC) and $i_s$, sending a difference value to a voltage and current dual loop control, finally, generating a corresponding PWM signal $d_p$, and controlling the bidirectional DC/DC converter by $d_p$, $$U_{dc} = U^* - R(SOC)i_s + \left(k'_p + \frac{k'_i}{s}\right)(U^* - U_{dc}),$$

Wherein $k'_p$ and $k'_i$ are a proportional adjustment coefficient and an integral adjustment coefficient of the PI controller in the feedforward compensation controller, respectively, and s is a complex variable of a PI transfer function; and R (SOC) is a droop coefficient based on the state of charge (SOC) of the energy storage unit.

* * * * *